United States Patent
Mazzone

Patent Number: 6,068,189
Date of Patent: *May 30, 2000

[54] FOCUSING DEVICE INCLUDING CAPACITIVE TRANSDUCER POSITION SENSOR

[75] Inventor: Claudio Mazzone, Crespellano, Italy

[73] Assignee: Datalogic S.p.A., Lippo di Calderara di Reno (BO), Italy

[*] Notice: This patent issued on a continued prosecution application filed under 37 CFR 1.53(d), and is subject to the twenty year patent term provisions of 35 U.S.C. 154(a)(2).

[21] Appl. No.: 08/786,417

[22] Filed: Jan. 21, 1997

Related U.S. Application Data

[63] Continuation of application No. 08/786,417, Jan. 21, 1997.

[30] Foreign Application Priority Data

Jan. 18, 1996 [DE] Germany ............................ 196 01 644

[51] Int. Cl.[7] ............................................. G06K 7/10
[52] U.S. Cl. ........................... 235/462.23; 235/462.24
[58] Field of Search .................... 359/823, 824; 235/462, 472, 454, 462.22, 462.23, 462.24, 462.42; 250/234, 236; 324/658

[56] References Cited

U.S. PATENT DOCUMENTS

| | | | |
|---|---|---|---|
| 3,910,695 | 10/1975 | Fukuhara et al. | 353/101 |
| 4,051,529 | 9/1977 | Miyaoka | 358/128 |
| 4,537,489 | 8/1985 | Suzuki et al. | 354/403 |
| 4,733,261 | 3/1988 | Gunshi et al. | 369/90 |
| 4,831,275 | 5/1989 | Drucker | 235/462 |
| 5,302,812 | 4/1994 | Li et al. | 235/462 |
| 5,537,109 | 7/1996 | Dowd | 340/870.37 |
| 5,706,143 | 1/1998 | Hipp | 359/824 |

FOREIGN PATENT DOCUMENTS

| | | |
|---|---|---|
| 0 239 337 | 9/1987 | European Pat. Off. |
| 0620680 | 10/1989 | European Pat. Off. |
| 3243920 | 6/1983 | Germany |

*Primary Examiner*—Michael G Lee
*Assistant Examiner*—Drew A. Dunn
*Attorney, Agent, or Firm*—Sughrue, Mion, Zinn, Macpeak & Seas, PLLC

[57] ABSTRACT

A focusing device (1) for a light receiving device (3) having at least one lens device (5) and a light sensor (7) exposed to the incident light is proposed, which is distinguished by the fact that the lens device (5) is designed to be stationary and that an actuation device (9), which displaces the light sensor (7) parallel to itself, and a position sensor (27), which detects the current position of the light sensor (7), are provided.

87 Claims, 5 Drawing Sheets

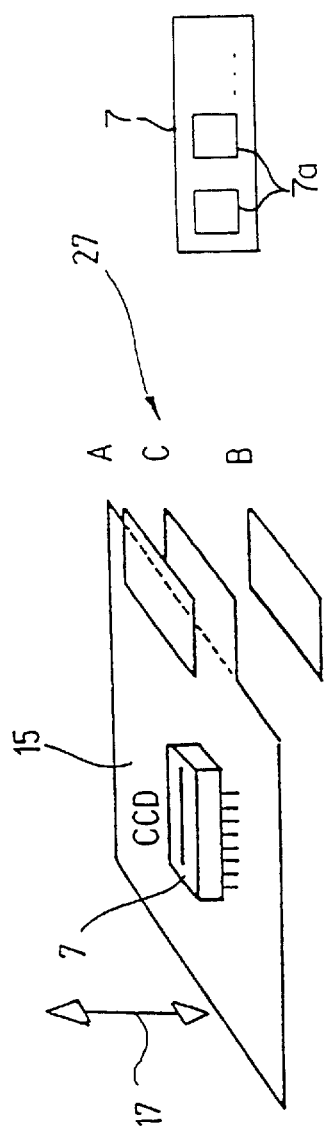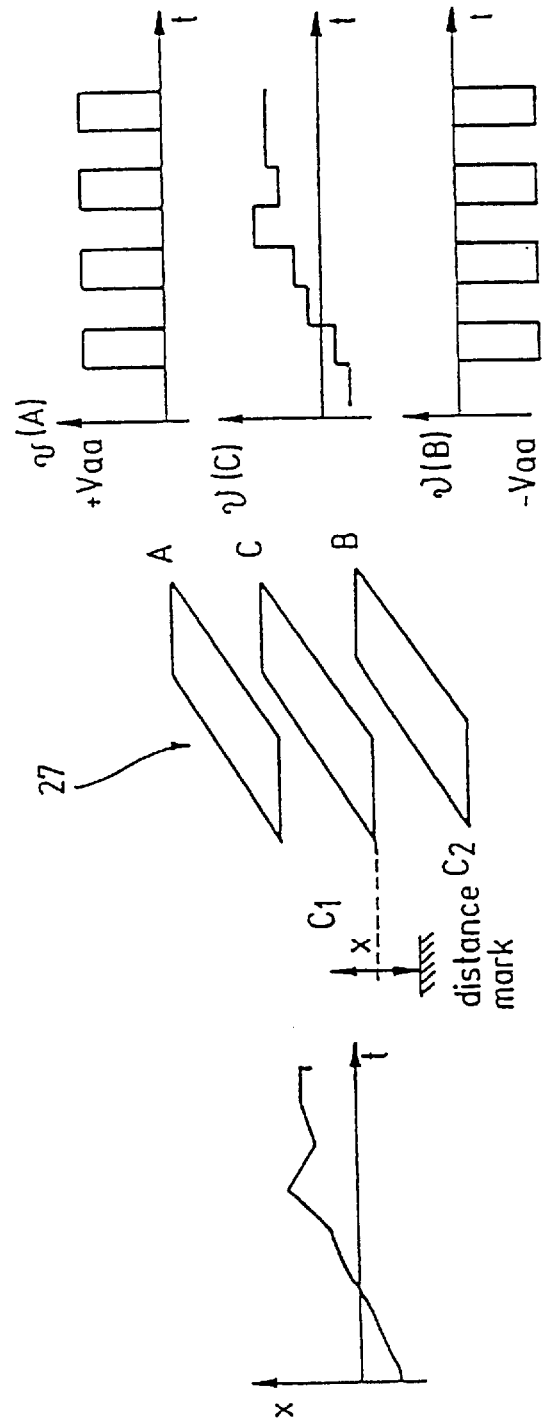

FOCUSING DEVICE INCLUDING CAPACITIVE TRANSDUCER POSITION SENSOR

This is a continuation of application Ser. No. 08/786,417 filed Jan. 21, 1997, the disclosure of which is incorporated herein by reference.

BACKGROUND OF THE INVENTION

The invention relates to a focusing device for a light receiving device having at least one lens device and having an actuation device characterized in that the actuation device can be used to displace at least one element arranged in the light path and having a mass which is less than that of the lens device.

Focusing devices of the type mentioned here are known. They effect a displacement of a lens device which interacts with the light receiving device and is relatively heavy. It has emerged that focusing devices of this type are thus too sluggish and are often too inaccurate as well.

SUMMARY OF THE INVENTION

Therefore, the object of the invention is to provide a focusing device of the above mentioned type which does not have these disadvantages.

A focusing device for a light receiving device having at least one lens device and having an actuation device characterized in that the actuation device can be used to displace at least one element arranged in the light path and having a mass which is less than that of the lens device is proposed for achieving the object. The focusing device can respond very rapidly due to the fact that the lens device is designed to be stationary and that an actuation device can be used to displace at least one element arranged in the light path and having a mass which is less than that of the lens.

In a preferred embodiment of the focusing device, a light sensor is displaced by the actuation device. Since the said sensor is arranged at the focal point of the focusing device, it may be designed to be significantly smaller than the lens device concentrating the light beam, and this leads to a considerable reduction in mass. The light sensor can be displaced by the actuation device very quickly into the position in which focusing is ensured.

An embodiment of the focusing device is further preferred in which the light sensor is displaced in such a way that the light always impinges perpendicularly on the light-sensitive surface of the light sensor. An identical displacement distance is thus produced for the entire surface area exposed to the incident light, with the result that the same focusing conditions are provided everywhere.

An embodiment of the focusing device is further preferred in which, for the purpose of focusing, the actuation device moves a mirror having a mass which is less than that of the lens. It is ensured in this case, too, that the focusing device responds rapidly, since only relatively light parts have to be moved during focusing.

An embodiment of the focusing device is particularly preferred in which the mirror has two reflecting surfaces which can be exposed to light and enclose between them an obtuse angle of preferably 90°. The incident light is reflected in such a way that the reflected light runs virtually parallel to the direction of incidence. If this mirror is now moved by the actuation device, then the light path is altered by an amount equal to twice the displacement of this mirror. The distances to be handled by the actuation device to effect focusing are thus very short, with the result that focusing can be achieved even more rapidly.

An embodiment of the focusing device is preferred in which the actuation device has a coil and a magnet interacting with the latter, and in addition a drive circuit. The actuation device thus has a very simple structure, is not very susceptible to disturbances and, moreover, can be implemented in a cost-effective manner.

An embodiment of the focusing device is further preferred in which the position sensor detecting the position of the light sensor is a capacitive transducer. The current position of the light sensor can thus be detected in a simple and very precise manner.

An embodiment of the focusing device is particularly preferred in which the light sensor and the position sensor are arranged on one and the same printed circuit board. The focusing device can thus be implemented in a relatively cost-effective and very compact manner.

BRIEF DESCRIPTION OF THE DRAWINGS

The invention is explained in more detail below using the drawings, in which:

FIG. 2a shows a perspective view of part of the first focusing device;

FIG. 2b is a plan view of the surface of the light sensor;

FIGS. 3a, 3b and 3c are illustrations to explain the functioning of the focusing device;

DETAILED DESCRIPTION OF THE INVENTION

The focusing device described below is used together with light receiving devices which serve, for example, to scan information assigned to objects, for example bar codes.

Devices of this type serve to pick up the light reflected from the objects, or from the information zones to be acquired, and to determine therefrom the information which has been read off. It is essential for the precise acquisition of the information that the reflected light is concentrated distinctly within the light receiving device. Focusing devices are used to achieve this concentration.

Figure 1:
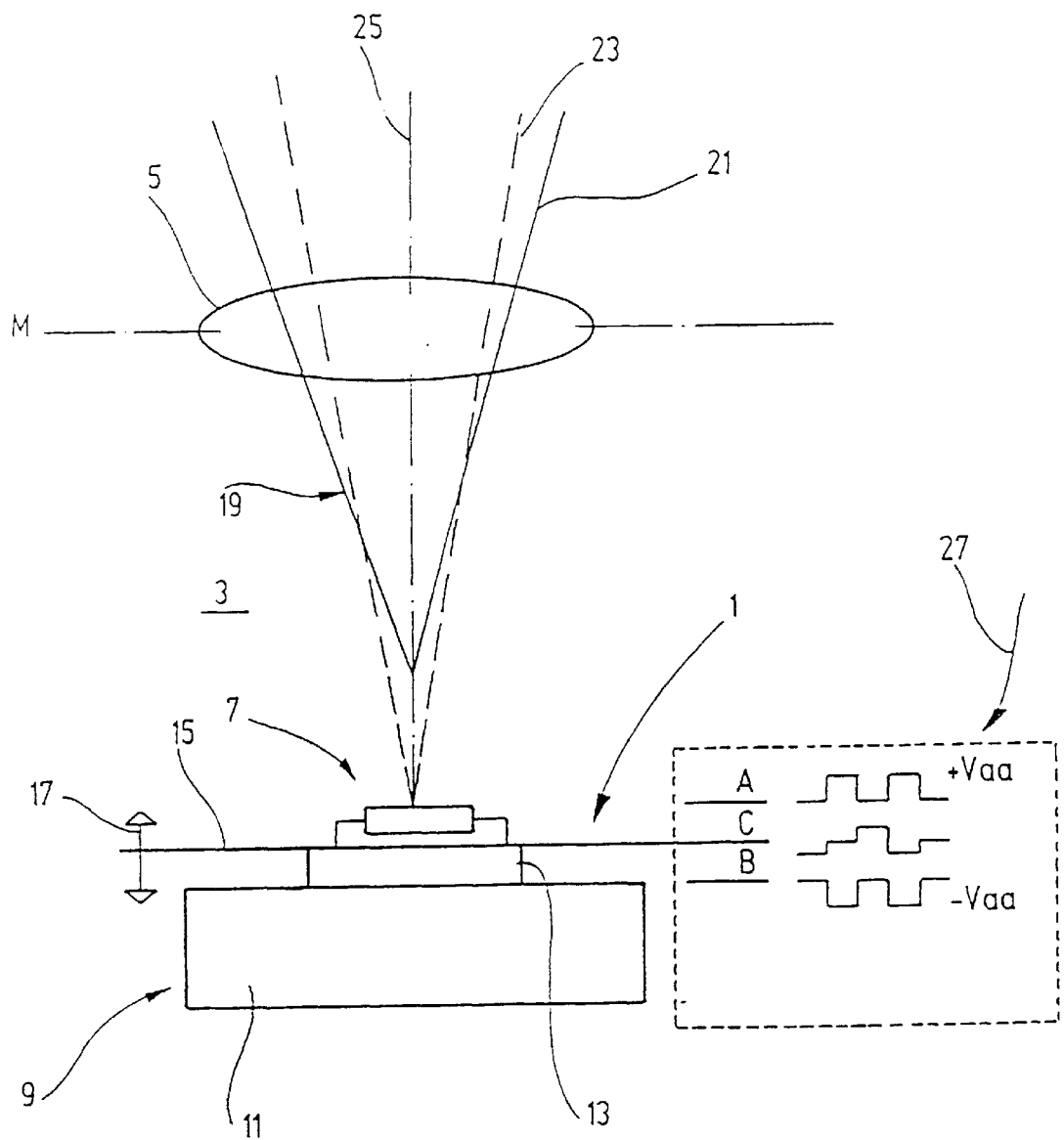
FIG. 1 shows a schematic sketch of a first focusing device having a lens device and a light sensor.

FIG. 1 shows a detail of a focusing device 1 of a light receiving device 3, which has a lens device 5 and a light sensor 7 which is designed, for example, as a CCD device (charge-coupled device). The lens device 5 is arranged so as to be fixed in position, while the light sensor 7 is designed to be movable and is provided with an actuation device 9. The actuation device has a magnet 11, which is designed, for example, as a permanent magnet, and a coil 13, to which a variable current can be applied via a drive circuit (not illustrated here). The light sensor 7 is arranged on a carrier board 15 which can be displaced—as indicated by a double arrow 17—parallel to itself in the direction of the incident light 19. Different light incidence situations, in response to which the focusing device 1 must effect focusing, are provided by continuous lines 21 and dashed lines 23.

Finally, FIG. 1 also indicates the direction of light incidence, or the light course, by a dot-dashed line 25 which is perpendicular, during the entire focusing operation, to a plane which coincides with the surface of the light sensor 7.

FIG. 1 additionally indicates a position sensor 27, which is designed as a capacitive transducer and has two stationary boards A, B and, in between, a movable board C. The movable board C is formed by a continuation of the carrier board 15 in the case of the exemplary embodiment illustrated here. It is evident from the sketch illustrated in FIG. 1 that a modulated voltage signal, in this case a rectangular-waveform signal +Vaa and −Vaa, is applied to the stationary boards A and B. The two voltage signals have an opposite polarity; otherwise, their characteristic over time is identical.

The coil 13 must be coupled to the carrier board 15 in such a way that the carrier board follows every movement of the coil 13; a rigid coupling therefore exists. A movement of the carrier board 15 compulsorily produces a movement of the movable board C of the position sensor 27. It is thus possible to pick off from this movable board C a voltage signal which is a function of the current position of this board. This signal is fed to an evaluation circuit (not illustrated here) which evaluates the signal picked off from the movable board C in such a way that the current position of the carrier board 15 or of the light sensor 7 can be detected and, consequently, it is possible to ensure optimum focusing.

It is also possible to feed the signal of the evaluation circuit to the drive circuit of the actuation device 9 and hence implement a control loop.

FIG. 2a diagrammatically shows in a perspective arrangement a detail of the focusing device 1 illustrated in FIG. 1, namely the carrier board 15, the light sensor 7, the two stationary boards A and B of the position sensor 27 and also the movable board C thereof. It becomes clear in this illustration that the movable board C is part of the carrier board 15. An embodiment is particularly preferred in which the carrier board 15 and the movable board C are of integral design. The carrier board 15 may be part of a printed circuit board. The surface of the light sensor 7 has a plurality of light sensitive surface regions 7a as shown in FIG. 2b.

The correlation between the current position of the movable board C and the signal which can be picked off at this board will be explained using FIG. 3.

A diagram illustrating the position x of the movable board C against the time t is represented in FIG. 3a. The two stationary boards A and B and also the movable board C of the position sensor 27, designed as a capacitive transducer, are represented in center FIG. 3b. A first capacitance $C_1$ is formed between the stationary board A and the movable board C, and a second capacitance $C_2$ is formed between the stationary board B and the movable board C.

Different voltage signals are plotted in FIG. 3c, that is to say, therefore, a characteristic of the voltage v against the time t. The earth potential coincides with the abscissa in all three diagrams.

A rectangular-waveform voltage signal which has the maximum voltage +Vaa and is applied to the stationary board A is represented in the top diagram. In FIG. 3c, the bottom diagram illustrates against the time t the rectangular-waveform voltage signal which is present across the stationary board B and assumes the value −Vaa as its maximum potential. It is evident that voltage signals of opposite polarity are applied to the two boards A and B.

A displacement of the movable board C in accordance with the distance diagram illustrated in FIG. 3a produces across the board C a voltage signal having a characteristic such as the one produced in the center diagram of the voltage v against the time t.

It is already evident from the roughly sketched illustration in FIG. 3 that the voltage signal picked off at the board C corresponds to the displacement of the board which is produced in the distance diagram (distance x against the time t) in FIG. 3a.

A particularly simple implementation of the actuation device 9 is produced if—as in the case of a loudspeaker device—use is made of a permanent magnet and a coil 13 which is driven by means of a drive circuit and through which current flows. The signal, serving to drive the coil, of the drive circuit can be generated taking account of the signal emitted by the evaluation circuit, the voltage signal which is present across the movable board C being applied to the evaluation circuit. In this way, it is possible to implement a control loop which can generate a control signal from a suitable device in order to establish the optimum focusing position.

The focusing device can have a particularly compact and simple structure, since the position sensor 27 interacts directly with the carrier board 15 of the focusing device 1. It is possible to implement a compact structure, in particular when the carrier board 15 is part of the position sensor 27 and forms the movable board C thereof, and this compact structure leads to the focusing device 1 having a very low mass and hence being very quick to react.

The focusing device is very small when the light sensor 7 and the position sensor 27 are part of a single integrated circuit.

It is particularly advantageous that, in the case of the focusing device illustrated here, the light sensor 7 is displaced parallel to itself, with the result that the light path corresponding to the dot-dashed line 25 is perpendicular to the surface of the light sensor 7 in all positions. The focusing of one of the plurality of light sensitive surface regions 7a of the light sensor 7 simultaneously effects the focusing of all the other surface regions situated in one and the same plane. In other words, the surface regions 7a of the light sensor 7 have the same distance from an imaginary centre plane M of the lens device 5.

Figure 4:
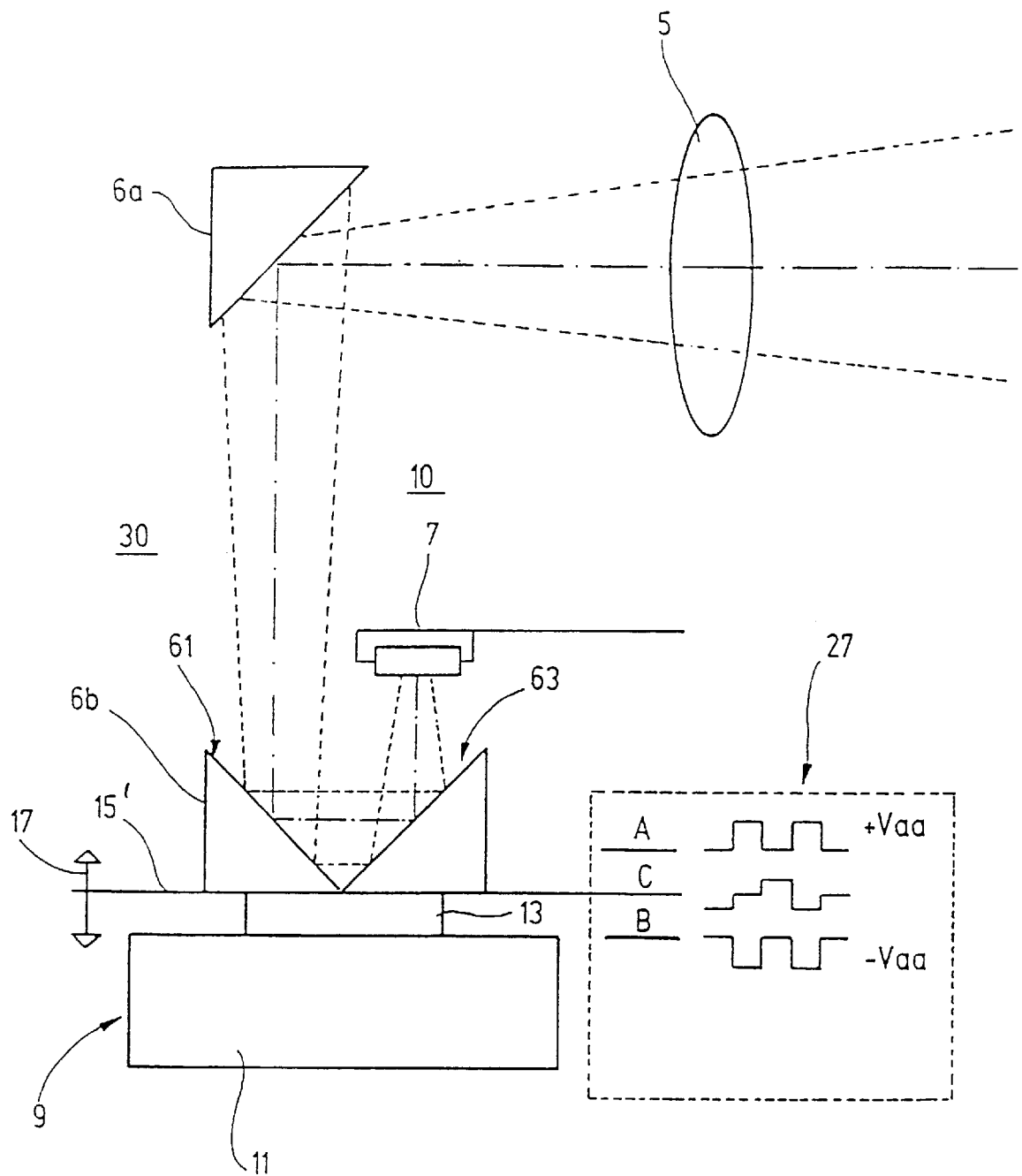
FIG. 4 shows a schematic sketch of a second focusing device having a lens device, a light sensor and also a mirror device.

FIG. 4 shows a second focusing device 10. Parts of this focusing device which were also illustrated in FIGS. 1 to 3 are given the same reference symbols, so that reference may be made to the description above.

The focusing device 10 has a light receiving device 30 which includes a lens device 5 and a mirror device which comprises two mirrors in this case. The said mirror device is provided in this case with a first mirror 6a and with a second mirror 6b. The second mirror 6b is distinguished by the fact that it comprises two reflecting surfaces 61 and 63, which can be exposed to light and enclose an obtuse angle of preferably 90°. The result of this is that light beams incident on the second mirror 6b are deflected twice, so that in total a deflection angle of 180° is produced and the incident and reflected light beams run parallel to one another. The beam courses are indicated by dashed lines. The two mirrors 6a and 6b are arranged with respect to one another in such a way that light which is reflected from an object and concentrated by the lens device 5 impinges on a light sensor 7, which is designed in this case, for example, as a CCD device.

The base bodies of the two mirrors 6a and 6b can be designed as desired; it is therefore possible to use customary mirror boards. Especial success has been obtained by base bodies of prismatic design—also illustrated in this case— which have at least one reflective outer surface. The mirror 6a has a single prism, the mirror 6b has two prisms or a double prism as base body.

The lens device 5 of this focusing device 10 is arranged fixed in position. The second mirror 6b is coupled to an actuation device 9, which includes, for example, a magnet 11, which is designed as a permanent magnet, and a coil 13, to which a variable current can be applied via a drive circuit (not illustrated here). The second mirror 6b is fixed on a carrier board 151, which—as indicated by a double arrow 17—can be displaced parallel to itself.

The actuation device 9 could also be coupled to the first mirror 6a or alternatively to the light sensor 7. The latter variant has already been explained using FIGS. 1 to 3.

The second mirror 6b which can be displaced for focusing interacts with a position sensor 27, which is designed as a capacitive transducer and has two stationary boards A and B and, in between, a movable board C. A position sensor 27 of the type mentioned here has been explained in detail using FIGS. 1 to 3, so that reference may be made to the description relating to these figures.

It becomes clear that when the second mirror 6b is displaced with the aid of the actuation device 9 by a distance x, the light path is altered by a distance of 2x. Therefore, particularly small movements are needed here to effect focusing.

The movable mirror 6b, in particular, may be designed to be very light, since low-mass plastic parts can form the base body of the mirror 6b and only the reflecting surfaces which can be exposed to light have to be designed to be highly reflective, and this can be achieved, for example, by means of metal vapour deposition.

On account of the special surface of the mirror, only a relatively small displacement distance is required, with the result that the focusing device 10 permits very rapid focusing.

It is evident from FIG. 4 that the focusing device 10 is constructed such that incident light reaches the first mirror 6a via the lens device 5 and, from this mirror, reaches the second mirror 6b. The incident light is diverted to the light sensor 7 by the two reflecting surfaces 61 and 63.

Figure 5:
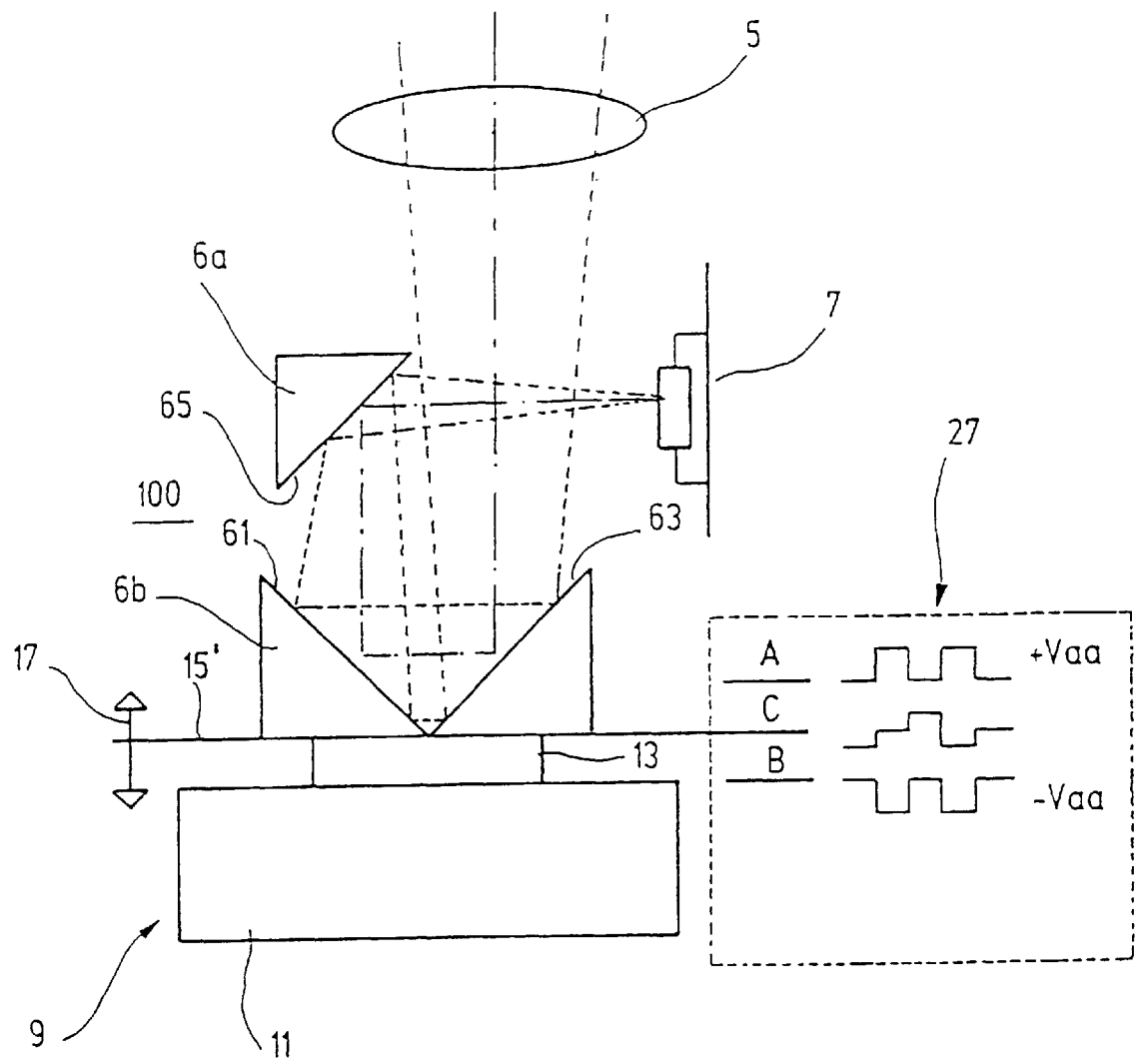
FIG. 5 shows a modified design of the second focusing device according to FIG. 4.

It is clearly discernible in FIG. 5 that the first mirror 6a, which in this case is of essentially prismatic design, can also be arranged in the light path between the light sensor 7 and the second mirror 6b. The light which is incident upon the focusing device illustrated in FIG. 5 in this case reaches the second mirror 6b having the two reflecting surfaces 61 and 63 via the lens device 5 and is reflected back from this mirror onto the reflecting surface 65 of the first mirror 6a, and from there finally reaches the light sensor 7.

In the case of this refinement of the focusing device 100, too, the second mirror 6b is displaced by an actuation device 9 which has a magnet 11, which is designed, for example, as a permanent magnet, and a coil 13, through which a variable current flows.

The second mirror 6b is arranged in this case, as in the case of the exemplary embodiment according to FIG. 4, on a carrier board 15', which—as indicated by a double arrow 17—can be displaced parallel to itself.

The movable second mirror 6b is once more assigned a position sensor 27, which is designed as a capacitive transducer and has two stationary boards A and B and, in between, a movable board C. The structure and mode of operation correspond to the position sensors 27 explained using FIGS. 1 to 4, so that it is not necessary to elaborate here.

Figure 6:
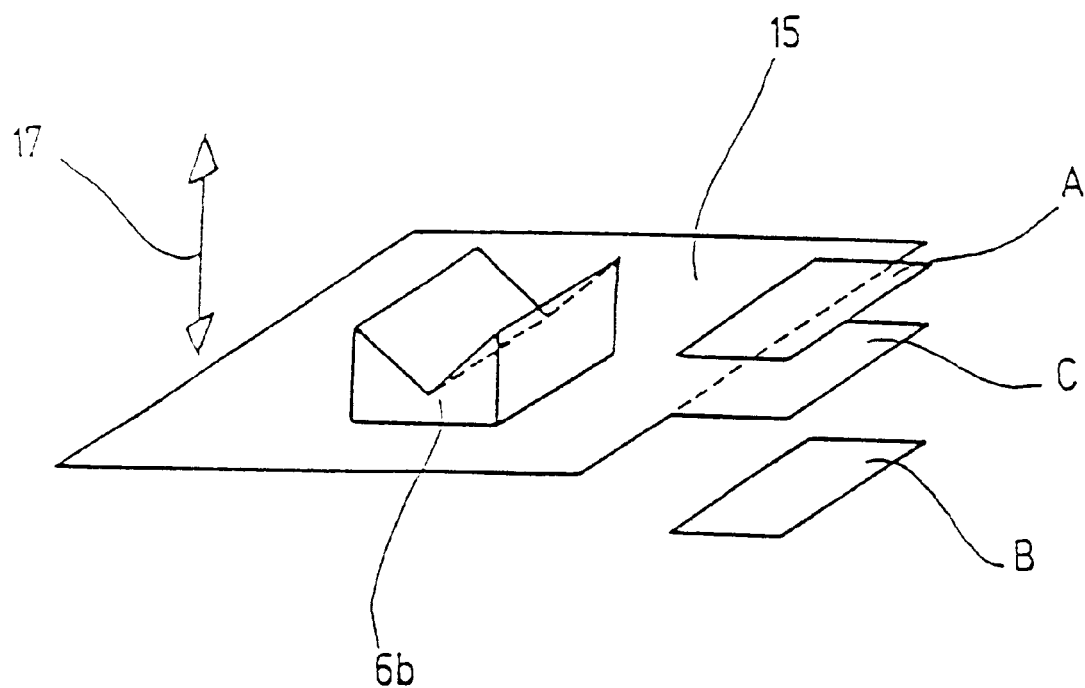
FIG. 6 shows a perspective view of part of the second focusing device.

FIG. 6 diagrammatically shows in a perspective arrangement a detail of the focusing devices 10 and 100 which are illustrated in FIGS. 4 and 5. The carrier board 15', which carries the second mirror 6b and can be displaced by means of the actuation device 9 (not illustrated here), as illustrated by a double arrow 17, is clearly discernible. The carrier board 15' exhibits here the movable board C, which interacts with the stationary boards A and B of the position sensor 27 which is designed as a transducer. The board C is preferably of integral design with the carrier board 15'.

In this case, the carrier board 15' may also be part of a printed circuit board.

The correlation between the current position of the movable board C and the signal which can be picked off at this board corresponds to that which has been represented in detail using FIGS. 2a and 3, so that it is not necessary to elaborate here. Reference is made instead to the description relating to these figures.

Finally, it becomes clear that a focusing device can also be provided with a plurality of actuation devices, which act, on the one hand, on one or more of the mirrors and, if necessary, additionally on the carrier board, too, on which the light sensor 7 of the focusing devices 10 and 100 is fitted. Consequently, it is possible to add the placements, with the result that a particularly large depth of field range is produced for a focusing device of the type mentioned here.

I claim:

1. A focusing device for a light receiving apparatus comprising a plurality of elements including lens means for focusing light from an object, light sensor means for sensing light passing through said lens means and actuation means for displacing at least one element and a light path defined between the lens means and the light sensor means, the light sensor means including a plurality of light sensitive surface regions, wherein said at least one element is mounted on a carrier board for movement by said actuation means in a direction perpendicular to the carrier board and parallel to incident light directed onto said at least one element whereby all the light sensitive surface regions of the light sensor means are simultaneously illuminated by light in a substantially perpendicular way, and capacitive transducer means operatively associated with said carrier board and connected to said actuation means for providing a signal to said actuation means for controlling said actuation means.

2. A focusing device according to claim 1, wherein at least said one element arranged for display in the light path is the light sensor means.

3. A focusing device according to claim 1, wherein said at least one element arranged for displacement in the light path is a mirror having two reflecting surfaces which can be exposed to light and enclose between them an angle of substantially 90°.

4. A focusing device according to claim 1, wherein said capacitive transducer means is comprised of two stationary boards with said carrier board disposed for movement therebetween.

5. A focusing device according to claim 4, wherein rectangular-waveform voltage signals of opposite polarity are applied to the two stationary boards of the capacitive transducer.

6. A focusing device according to claim 4, wherein a signal is picked off from the movable board and is fed to an evaluation circuit.

7. A focusing device according to claim 6, wherein an output signal is picked off from the evaluation circuit and fed to the actuation device so as to implement a control loop.

8. A focusing device according to claim 1, wherein said actuation means is comprised of a coil which interacts with a drive circuit and a magnet which interacts with the coil.

9. A focusing device for a light receiving apparatus comprising:
- a plurality of elements including
  - lens means,
  - light sensor means,
  - a position sensor,
  - actuation means,
- a light path defined between the lens means and the light sensor means,
  - wherein the actuation means is operative to displace at least one displaceable element arranged in the light path,
  - wherein said position sensor is integral with said at least one displaceable element.

10. A focusing device according to claim 9, wherein said at least one displaceable element arranged in the light path is the light sensor means.

11. A focusing device according to claim 9, wherein said at least one displaceable element arranged in the light path is a mirror having two reflecting surfaces which can by exposed to light and enclose between them an angle of substantially 90°.

12. A focusing device according to claim 9, wherein the light sensor means is a CCD.

13. A focusing device according to claim 9, wherein aid at least one element is arranged on a carrier board displaceable by means of the actuation means.

14. A focusing device according to claim 13, wherein the carrier board is part of a printed circuit board.

15. A focusing device according to claim 9, wherein the position sensor comprises a capacitive transducer.

16. A focusing device according to claim 15, wherein the capacitive transducer comprise two stationary boards and a movable board therebetween.

17. A focusing device according to claim 16, wherein the movable board of the capacitive transducer is part of the carrier board.

18. A focusing device according to claim 16, wherein the movable board of the capacitive transducer and the carrier board are of integral design.

19. A focusing device according to claim 16, wherein a rectangular-waveform voltage signal is applied to the two stationary boards of the capacitive transducer.

20. A focusing device according to claim 16, wherein rectangular-waveform voltage signals of opposite polarity are applied to the two stationary board of the capacitive transducer.

21. A focusing device according to claim 16, wherein a signal is picked off from the movable board and is fed to an evaluation circuit.

22. A focusing device according to claim 21, wherein an output signal is picked off from the evaluation circuit and fed to the actuation device so as to implement a control loop.

23. A focusing device according to claim 9, wherein the actuation means comprises a coil which interacts with a drive circuit and a magnet which interacts with the coil.

24. A focusing device for a light receiving apparatus comprising:
- a plurality of elements including
  - lens means,
  - a CCD light sensor means, including a plurality of light sensitive surface regions,
  - a position sensor,
  - actuation means,
- a light path defined between the lens means and the light sensor means,
  - wherein the actuation means is operative to displace at least one displaceable element arranged in the light path, in such a way that all the light sensitive surface regions of the CCD light sensor means are contemporaneously illuminated by light in a substantially perpendicular way.

25. A focusing device according to claim 24, wherein said at least one element arranged in the light path is the light sensor means.

26. A focusing device according to claim 24, wherein said at least one element arranged in the light path is a mirror having two reflecting surfaces which can be exposed to light and enclosed between them an angle of substantially 90°.

27. A focusing device according to claim 24, wherein said at least one element is arranged on a carrier board displaceable by means of the actuation means.

28. A focusing device according to claim 27, wherein said carrier board interacts with a position sensor.

29. A focusing device according to claim 28, wherein the position sensor comprises a capacitive transducer.

30. A focusing device according to claim 29, wherein the capacitive transducer comprise two stationary boards and a movable board therebetween.

31. A focusing device according to claim 30, wherein the movable board of the capacitive transducer is part of the carrier board.

32. A focusing device according to claim 31, wherein the movable board of the capacitive transducer and the carrier board are of integral design.

33. A focusing device according to claim 30, wherein a rectangular-waveform voltage signal is applied to the two stationary board of the capacitive transducer.

34. A focusing device according to claim 30, wherein rectangular-waveform voltage signals of opposite polarity are applied to the two stationary boards of the capacitive transducer.

35. A focusing device according to claim 30, wherein a signal is picked off from the movable board and is fed to an evaluation circuit.

36. A focusing device according to claim 35, wherein an output signal is picked off from the evaluation circuit and fed to the actuation device so as to implement a control loop.

37. A focusing device according to claim 27, wherein the carrier board is part of a printed circuit board.

38. A focusing device according to claim 24, wherein the actuation means comprises a coil which interacts with a drive circuit and a magnet which interacts with the coil.

39. A focusing device for a light receiving apparatus comprising:
- a plurality of elements including
  - lens means,
  - a carrier board,
  - a light sensor means, including a plurality of light sensitive surface regions,
  - a position sensor,
  - actuation means,
- a light path defined between the lens means and the light sensor means,
  - wherein the actuation means is operative to displace at least one displaceable element arranged in the light path and carried by the carrier board, in such a way that all the light sensitive surface regions of the light sensor means are contemporaneously illuminated by light in a substantially perpendicular way.

40. A focusing device according to claim 39, wherein said at least one element arranged in the light path is the light sensor means.

41. A focusing device according to claim 39, wherein said at least one element arranged in the light path is a mirror having two reflecting surfaces which can be exposed to light and enclose between them an angle of substantially 90°.

42. A focusing device according to claim 39, wherein the light sensor means is a CCD.

43. A focusing device according to claim 39, wherein said carrier board interacts with a position sensor.

44. A focusing device according to claim 43, wherein the position sensor comprises a capacitive transducer.

45. A focusing device according to claim 44, wherein the capacitive transducer comprises two stationary boards and a movable board therebetween.

46. A focusing device according to claim 45, wherein the movable board of the capacitive transducer is part of the carrier board.

47. A focusing device according to claim 45, wherein the movable board of the capacitive transducer and the carrier board are of integral design.

48. A focusing device according to claim 45, wherein a rectangular-waveform voltage signal is applied to the two stationary boards of the capacitive transducer.

49. A focusing device according to claim 45, wherein rectangular-waveform voltage signals of opposite polarity are applied to the two stationary board of the capacitive transducer.

50. A focusing device according to claim 45, wherein a signal is picked off from the movable board and is fed to an evaluation circuit.

51. A focusing device according to claim 50, wherein an output signal is picked off from the evaluation circuit and fed to the actuation device so as to implement a control loop.

52. A focusing device according to claim 39, wherein the carrier board is part of a printed circuit board.

53. A focusing device according to claim 39, wherein the actuation means comprises a coil which interacts with a drive circuit and a magnet which interacts with the coil.

54. A focusing device for a light receiving apparatus comprising:
   plurality of elements including
      lens means,
      a carrier board,
      a light sensor means, including a plurality of light sensitive surface regions,
      a capacitive transducer position sensor,
      actuation means,
   a light path defined between the lens means and the light sensor means,
      wherein the actuation means is operative to displace at least one displaceable element arranged in the light path and carried by the carrier board, in such a way that all the light sensitive surface regions of the light sensor means are contemporaneously illuminated by light in a substantially perpendicular way.

55. A focusing device according to claim 54, wherein said at least one element arranged in the light path is the light sensor means.

56. A focusing device according to claim 54, wherein said at least one element arranged in the light path is a mirror having two reflecting surfaces which can be exposed to light and enclose between them an angle of substantially 90°.

57. A focusing device according to claim 54, wherein the light sensor means is a CCD.

58. A focusing device according to claim 54, wherein said at least one element is arranged on a carrier board displaceable by means of the actuation means.

59. A focusing device according to claim 58, wherein the capacitive transducer comprise two stationary boards and a movable board therebetween.

60. A focusing device according to claim 59, wherein the movable board of the capacitive transducer is part of the carrier board.

61. A focusing device according to claim 59, wherein the movable board of the capacitive transducer and the carrier board are of integral design.

62. A focusing device according to claim 59, wherein a rectangular-waveform voltage signal is applied to the two stationary board of the capacitive transducer.

63. A focusing device according to claim 59, wherein rectangular-waveform voltage signals of opposite polarity are applied to the two stationary boards of the capacitive transducer.

64. A focusing device according to claim 59, wherein a signal is picked off from the movable board and is fed to an evaluation circuit.

65. A focusing device according to claim 64, wherein an output signal is picked off from the evaluation circuit and fed to the actuation device so as to implement a control loop.

66. A focusing device according to claim 58, wherein the carrier board is part of a printed circuit board.

67. A focusing device according to claim 54, wherein the actuation means comprises a coil which interacts with a drive circuit and a magnet which interacts with the coil.

68. A focusing device for a light receiving apparatus comprising:
   a plurality of elements including
      lens means,
      a carrier board,
      a light sensor means, including a plurality of light sensitive surface regions,
      a capacitive transducer position sensor, including two stationary boards and a movable board therebetween, the movable board being integral with the carrier board,
      actuation means,
   a light path defined between the lens means and the light sensor means,
      wherein the actuation means is operative to displace at least one displaceable element arranged in the light path and carried by the carrier board, in such a way that all the light sensitive surface regions of the light sensor means are contemporaneously illuminated by light in a substantially perpendicular way.

69. A focusing device according to claim 68, wherein said at least one element arranged in the light path is the light sensor means.

70. A focusing device according to claim 68, wherein said at least one element arranged in the light path is a mirror having two reflecting surfaces which can be exposed to light and enclose between them an angle of substantially 90°.

71. A focusing device according to claim 68, wherein the light sensor means is a CCD.

72. A focusing device according to claim 68, wherein said at least one element is arranged on a carrier board displaceable by means of the actuation means.

73. A focusing device according to claim 72, wherein the carrier board is part of a printed circuit board.

74. A focusing device according to claim 68, wherein the actuation means comprises a coil which interacts with a drive circuit and a magnet which interacts with the coil.

75. A focusing device according to claim 68, wherein a rectangular-waveform voltage signal is applied to the two stationary boards of the capacitive transducer.

76. A focusing device according to claim 68, wherein rectangular-waveform voltage signals of opposite polarity are applied to the two stationary boards of the capacitive transducer.

77. A focusing device according to claim 68, wherein a signal is picked off from the movable board and is fed to an evaluation circuit.

78. A focusing device according to claim 77, wherein an output signal is picked off from the evaluation circuit and fed to the actuation device so as to implement a control loop.

79. A focusing device for a light receiving apparatus comprising:
a plurality of elements including
lens means,
a carrier board,
a CCD light sensor means, including a plurality of light sensitive surface regions,
a capacitive transducer position sensor, including two stationary boards and a movable board therebetween, the movable board being integral with the carrier board,
actuation means,
light path defined between the lens means and the light sensor means,
wherein the actuation means is operative to displace at least one displaceable element arranged in the light path and carried by the carrier board, in such a way that all the light sensitive surface regions of the CCD light sensor means are contemporaneously illuminated by light in a substantially perpendicular way,
wherein said position sensor is integral with said at least one displacement element.

80. A focusing device according to claim 79, wherein said at least one element arranged in the light path is the light sensor means.

81. A focusing device according to claim 79, wherein said at least one element arranged in the light path is a mirror having two reflecting surfaces which can be exposed to light and enclose between them an angle of substantially 90°.

82. A focusing device according to claim 79, wherein the carrier board is part of a printed circuit board.

83. A focusing device according to claim 79, wherein the actuation means comprises a coil which interacts with a drive circuit and a magnet which interacts with the coil.

84. A focusing device according to claim 79, wherein a rectangular-waveform voltage signal is applied to the two stationary boards of the capacitive transducer.

85. A focusing device according to claim 79, wherein rectangular-waveform voltage signals of opposite polarity are applied to the two stationary boards of the capacitive transducer.

86. A focusing device according to claim 79, wherein a signal is picked off from the movable board and is fed to an evaluation circuit.

87. A focusing device according to claim 86, wherein an output signal is picked off from the evaluation circuit and fed to the actuation device so as to implement a control loop.

* * * * *